(12) United States Patent
Garcia et al.

(10) Patent No.: US 7,565,504 B2
(45) Date of Patent: Jul. 21, 2009

(54) MEMORY WINDOW ACCESS MECHANISM

(75) Inventors: David J. Garcia, Los Gatos, CA (US);
Jeffrey R. Hilland, Cypress, TX (US);
Paul R. Culley, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 954 days.

(21) Appl. No.: 10/401,234

(22) Filed: Mar. 27, 2003

(65) Prior Publication Data

US 2004/0193908 A1 Sep. 30, 2004

(51) Int. Cl.
*G06F 12/00* (2006.01)
(52) U.S. Cl. .................. 711/163; 711/153; 711/154; 711/164; 709/213; 709/215; 709/226
(58) Field of Classification Search ................ 711/153, 711/154, 163, 164; 709/213, 215, 226
See application file for complete search history.

(56) References Cited

U.S. PATENT DOCUMENTS

| | | | |
|---|---|---|---|
| 5,325,532 A | 6/1994 | Crosswy et al. | |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,983,269 A | 11/1999 | Mattson et al. | |
| 6,018,620 A | 1/2000 | Culley et al. | |
| 6,047,323 A | 4/2000 | Krause | |
| 6,070,198 A | 5/2000 | Krause et al. | |
| 6,070,253 A | 5/2000 | Tavallaei et al. | |
| 6,157,967 A | 12/2000 | Horst et al. | |
| 6,163,834 A | 12/2000 | Garcia et al. | |
| 6,233,702 B1 | 5/2001 | Horst et al. | |
| 6,484,208 B1 | 11/2002 | Hilland | |
| 6,493,343 B1 | 12/2002 | Garcia et al. | |
| 6,496,940 B1 | 12/2002 | Horst et al. | |
| 6,502,203 B2 | 12/2002 | Barron et al. | |
| 6,578,122 B2* | 6/2003 | Beukema et al. ............ | 711/163 |
| 6,601,148 B2* | 7/2003 | Beukema et al. ............ | 711/153 |
| 6,854,032 B2* | 2/2005 | Dearth et al. .................. | 711/2 |
| 6,859,867 B1* | 2/2005 | Berry .......................... | 711/206 |
| 6,917,987 B2* | 7/2005 | Parthasarathy et al. ...... | 709/249 |
| 6,938,138 B2* | 8/2005 | Beukema et al. ............ | 711/163 |
| 6,947,970 B2* | 9/2005 | Berry .......................... | 709/212 |

(Continued)

FOREIGN PATENT DOCUMENTS

EP 0757318 A2 2/1997

*Primary Examiner*—Tuan V Thai
*Assistant Examiner*—Arpan Savla

(57) ABSTRACT

The disclosed embodiments may relate to memory window access, which may include a memory window and protection domain associated with a process. The memory window access setting or bit may also allow a plurality of memory windows to be associated with a protection domain for a process. The memory window access setting or bit may allow access to the memory window to be for the queue pairs in a certain protection domain or a designated queue pair.

21 Claims, 4 Drawing Sheets

U.S. PATENT DOCUMENTS

| | | | |
|---|---|---|---|
| 6,948,004 B2 * | 9/2005 | Gasbarro et al. | 709/250 |
| 7,299,266 B2 * | 11/2007 | Boyd et al. | 709/213 |
| 7,519,650 B2 * | 4/2009 | Boyd et al. | 709/200 |
| 2004/0049580 A1 * | 3/2004 | Boyd et al. | 709/226 |
| 2004/0049601 A1 * | 3/2004 | Boyd et al. | 709/250 |
| 2004/0095949 A1 * | 5/2004 | Elzur | 370/412 |

* cited by examiner

MEMORY WINDOW ACCESS MECHANISM

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. The QP may be defined to expose a segment of the memory within the local system to a remote system. Memory windows ("MWs") may be used to ensure that memory exposed to remote systems may be accessed by designated QPs. Protection domains ("PDs") may be used to restrict the access to memory windows associated with a designated QP. For example, access to a memory window may be restricted to all the QPs assigned to the same Protection Domain. In a large system, all QPs of a single process may be assigned to a single protection domain ("PD").

However, in a multi-client computing environment, if multiple clients use the same protection domain, other clients may be enabled to access and interfere with the remote memory segment attached to a memory window bound by a specific QP. Thus, system security may be compromised or system performance degraded.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
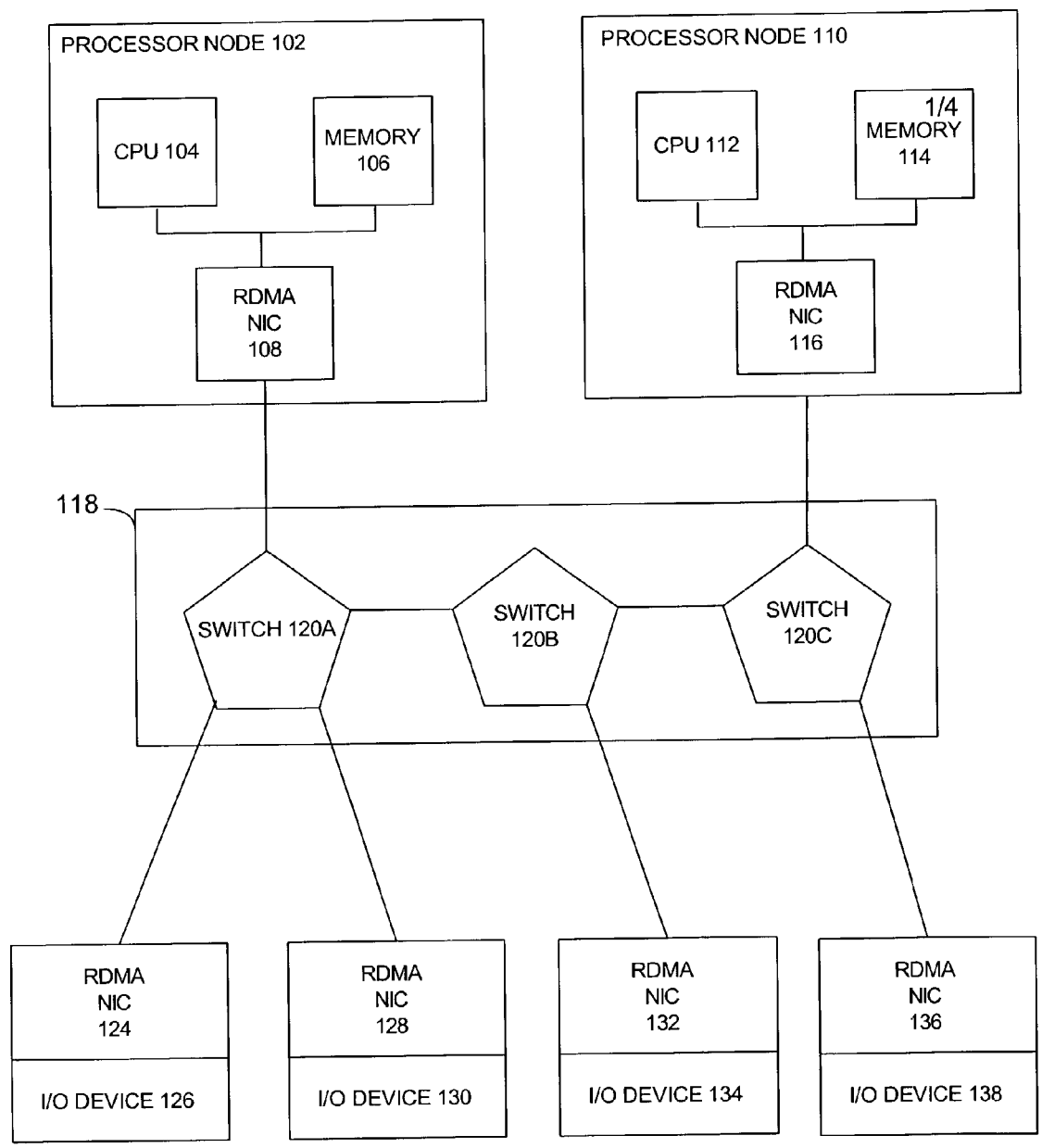
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
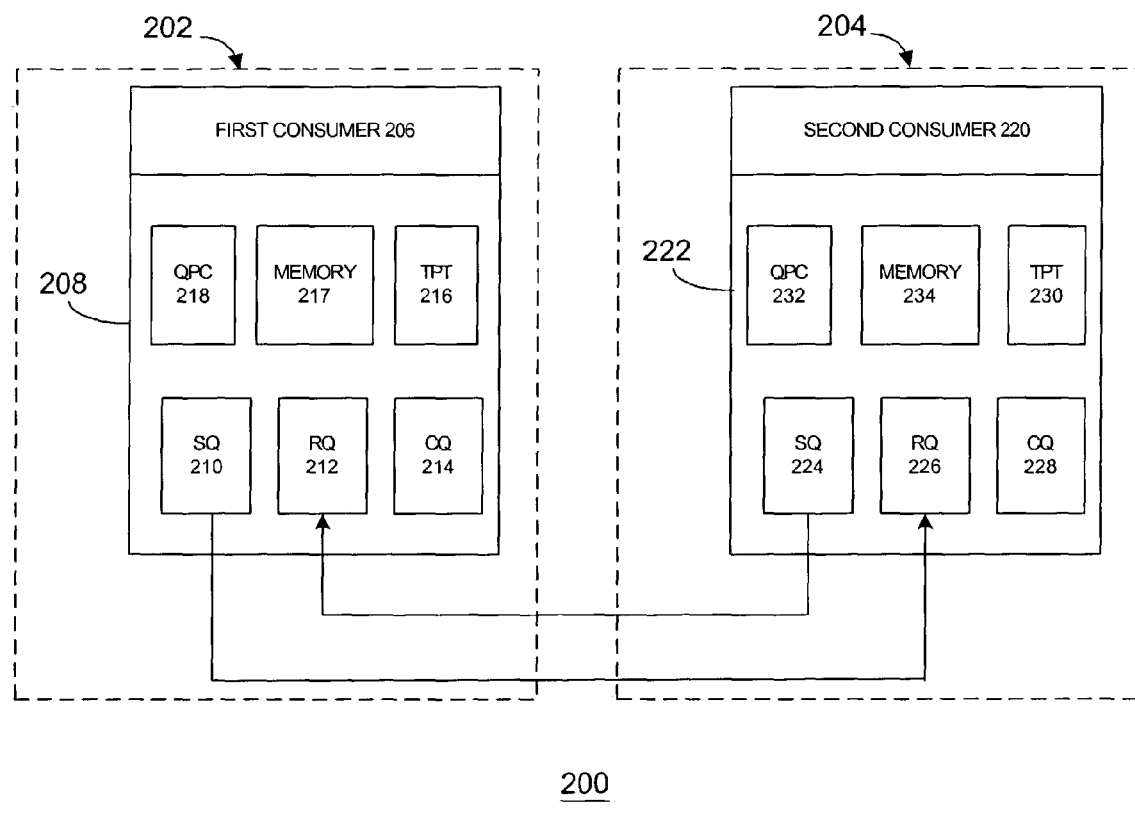
FIG. 2 is a block diagram that illustrates the use of a queue pair to transfer data between devices in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218. The memory 217 may be a portion of the memory 106 or 114 of FIG. 1 within the first node 202, or a separate portion of memory within the RNIC 208.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232. The memory 234 may be a portion of the memory 106 or 114 of FIG. 1 within the second node 204, or a separate portion of memory within the RNIC 222.

The memories 217 and 234 may be registered to different processes, each of which may correspond to the consumers 206 and 220. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs.

To prevent interferences in the memories 217 or 234, the memories 217 or 234 may be divided into memory regions ("MRs"), which may contain memory windows ("MWs"). An entry in the TPT 216 or 230 may describe the memory regions and may include a virtual to physical mapping of a portion of the address space allocated to a process. These memory regions may be registered with the associated RNIC and the operating system. The nodes 202 and 204 may send a unique steering tag ("STag") to identify the memory to be accessed, which may correspond to the memory region or memory window.

The STag may be used to identify a buffer that is being referenced for a given data transfer. A tagged offset ("TO") may be associated with the STag and may correspond to an offset into the associated buffer. Alternatively, a transfer may be identified by a queue number, a message sequence number and message offset. The queue number may be a 32-bit field, which identifies the queue being referenced. The message sequence number may be a 32 bit field that may be used as a sequence number for a communication, while the message offset may be a 32-bit field offset from the start of the message.

Also, the node 202 or 204 may have a unique QP identity for communications with the other node 202 or 204. By using the STag and QP, the access to the memory region by the node 202 or 204 over the designated QP may be restricted to STags that have the same PD. Memory windows may also be defined in the memories 217 and 234 to allow flexible and efficient access control to the memory regions. With a memory window, a process may use a send queue to bind a pre-allocated window or segment of memory to a specified portion of the memory region. Thus, the memory region and memory window may be utilized to restrict the memory that the various QPs may access within the memory 217 or 234. In this manner, QPs may avoid interference with one another. The interaction between QPs, PDs, MRs, MWs in the context of data transfers employing multiple QPs is explained with reference to FIG. 3.

Figure 3:
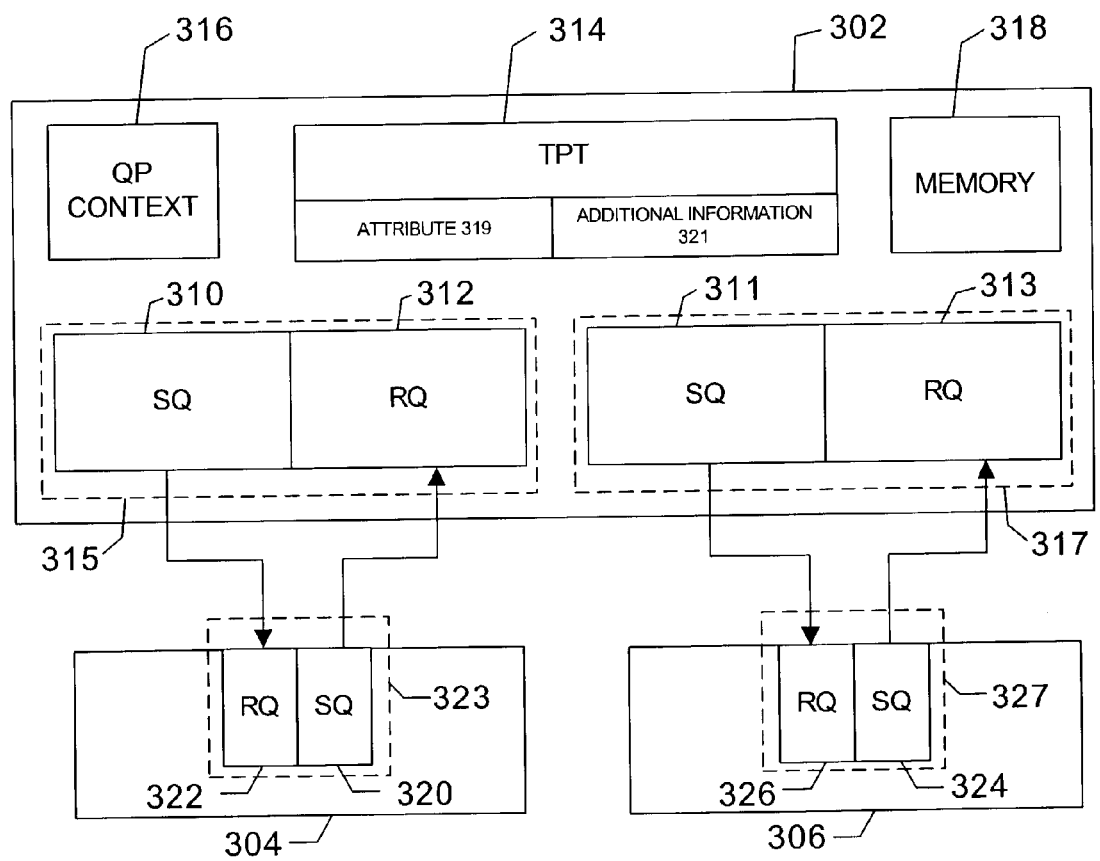
FIG. 3 is a block diagram illustrating data exchange using multiple queue pairs in accordance with embodiments of the present invention.

FIG. 3 is a block diagram illustrating data exchange using multiple queue pairs in accordance with embodiments of the present invention. The diagram is generally referred to by the reference numeral 300. A process or application may be operating on a server node 302, which may correspond to one of the nodes 202 or 204 (FIG. 2). The server node 302 may include a first send queue 310, a second send queue 311, a first receive queue 312 and a second receive queue 313, which may be similar to the queues 212 and 214 of FIG. 2. The use of two sets of send queues and receive queues indicates that two sets of QPs have been established for communication between the server node 302 and other devices. The send queue 310 and the receive queue 312 together form a QP that is identified by the reference numeral 315. The send queue 311 and the receive queue 313 together form a QP that is identified by the reference numeral 317.

The QP 315 may be adapted to exchange information with a corresponding QP 323, which may comprise a send queue 320 and a receive queue 322. The QP 323 may be located in a node 304, which may correspond to a device with which the server node 302 is exchanging information. The arrows between the send queue 310 and the receive queue 322 and between the send queue 320 and the receive queue 312 indicate the flow of information therebetween. Similarly, the QP 317 may be adapted to exchange information with a corresponding QP 327, which may comprise a send queue 324 and a receive queue 326. The QP 327 may be located in a node 306, which may correspond to a device with which the server node 302 is exchanging information. The arrows between the send queue 311 and the receive queue 326 and between the send queue 324 and the receive queue 313 indicate the flow of information therebetween.

The QPs 315 and 317 may be associated with a TPT 314, which may correspond to the TPT 216 of FIG. 2. A QP context 316 may correspond to the QP context 218 of FIG. 2. The TPT 314 may store information relating to memory regions, memory windows and multiple physical address tables ("PATs") associated with a memory 318. The TPT 314 may also include fields, such as an access control, protection domain data, a bit or setting for window access, physical address table size, page size, virtual address, first page offset, length, STag, or a physical address table pointer. These types of additional information and the like are identified in FIG. 3 by the reference numeral 321.

To provide access to the memory 318, a verb or command may be issued that results in the generation of a work request ("WR"). The WR may include a list of memory locations, such as memory windows or memory regions, from which data is intended to be read or written. The list, which may be referred to as a scatter/gather list ("SGL"), may reference the TPT 314. The SGL may be a list or collection of information in a table or array that may point to local data segments of the memory 318. For instance, each element in the SGL may include a local STag, local tagged offset (i.e. virtual address), and length. The processing of a WR may result in the creation of a work queue element ("WQE"), which may be posted to the appropriate queue for the command to be performed. Thus, the memory 318 may be accessed following the implementation of the specified command.

In an exemplary communication with the server node 302, the nodes 304 and 306 may send a unique STag to identify the memory to be accessed, such as STagA and STagB. The QP 315 may be used to access a memory window, which may be referred to as MWA, in memory 318 on the server node 302. The QP 317 may be used to access a memory window, which may be referred to as MWB, on the server node 302. The process on the server node 302 may have defined thereon a protection domain, which may be referred to as PDA, for both of the QPs 315 and 317.

Because MWA and MWB may be accessed from queue pairs 315 and 317, MWA and MWB may be assigned a protection domain value corresponding to PDA within the server node 302. Accordingly, if the access to the memory window MWA or MWB is verified against the protection domain PDA, then both the QPs 315 and 317 may access the memory windows MWA and MWB. Thus, the verification process for accessing a memory window MWA may not prevent other queue pairs such as the QP 317 from accessing the memory window MWA that is designated for the QP 315.

To provide security protection between the various clients from the memory 318 that is allocated to them, the process may utilize an attribute 319, which may comprise a bit or setting, to help ensure that designated memory window may be accessed by a designated QP 315 or 317. For example, the attribute 319 may be stored in the TPT 314, and may include a single bit, a plurality of bits, a plurality of fields which may store additional information or the like. The attribute 319 may be located elsewhere, for example, in a memory window context (not shown), as well.

The attribute 319 may indicate access restrictions for an associated memory window. The attribute 319 may be configured, set or written to when a verb (such as a "Bind Window" verb) is invoked. Such a verb may incorporate an input modifier to set or alter the setting or contents of the attribute 319. The attribute 319 may be used to indicate that QP checking is to be used in the process of verifying whether memory access is permitted to a given memory window. The attribute 319 may indicate that the QP 315 or 317 or group of QPs 315 and 317 in the same PD may be able to access a memory segment within the memory window, and may indicate fields that may be used to verify or allow access.

The attribute 319 may be used to specify that the associated memory window is accessible only by a specific QP such as one of the QP 315 or 317. The attribute 319 may also be used to indicate that the associated memory window may be accessed by any QP that belongs to a specific protection domain.

By way of example, the nodes 304 and 306 may be accessing memory windows within the server node 302. Within the server node 302, the node 304 may communicate over QP 315 that has a protection domain PDA and a memory window MWA. Also, within the server node 302, the node 306 may communicate over QP 317 that has a protection domain PDA, and a memory window MWB. In this example, the attribute 319 may indicate that a specific QP may access a memory window or that QPs in a certain protection domain may access a certain memory window. If the attribute 319 indicates that the memory window MWA is exclusive, then the QP 315 may have exclusive access to the memory window MWA. If queue pair 317 attempts to access the memory window MWA, the access to the memory window MWA may be denied. Similarly, if the attribute 319 indicates that the memory window MWA is non-exclusive, then the QPs 315 or 317 may be verified by the protection domain PDA, which may allow access to the memory window MWA.

As another example, the attribute 319 may be located in a memory window context or TPT 314 to signify that access rights are to be checked based on protection domain association or queue pair association. Upon binding the memory window, a QP checking bit may be set and the protection domain value in the memory window context may be replaced with the QP value or may be stored along with the protection domain value. Then, when an access is being validated, the attribute 319 may be reviewed. If the attribute indicates a predetermined state, then the QP number in the memory window context may be validated against the QP number in the QP context 316. However, if the attribute 319 corresponds to a different predetermined state, the protection domain of the QP 315 or 317 and the memory window may be validated against each other to validate the access.

Figure 4:
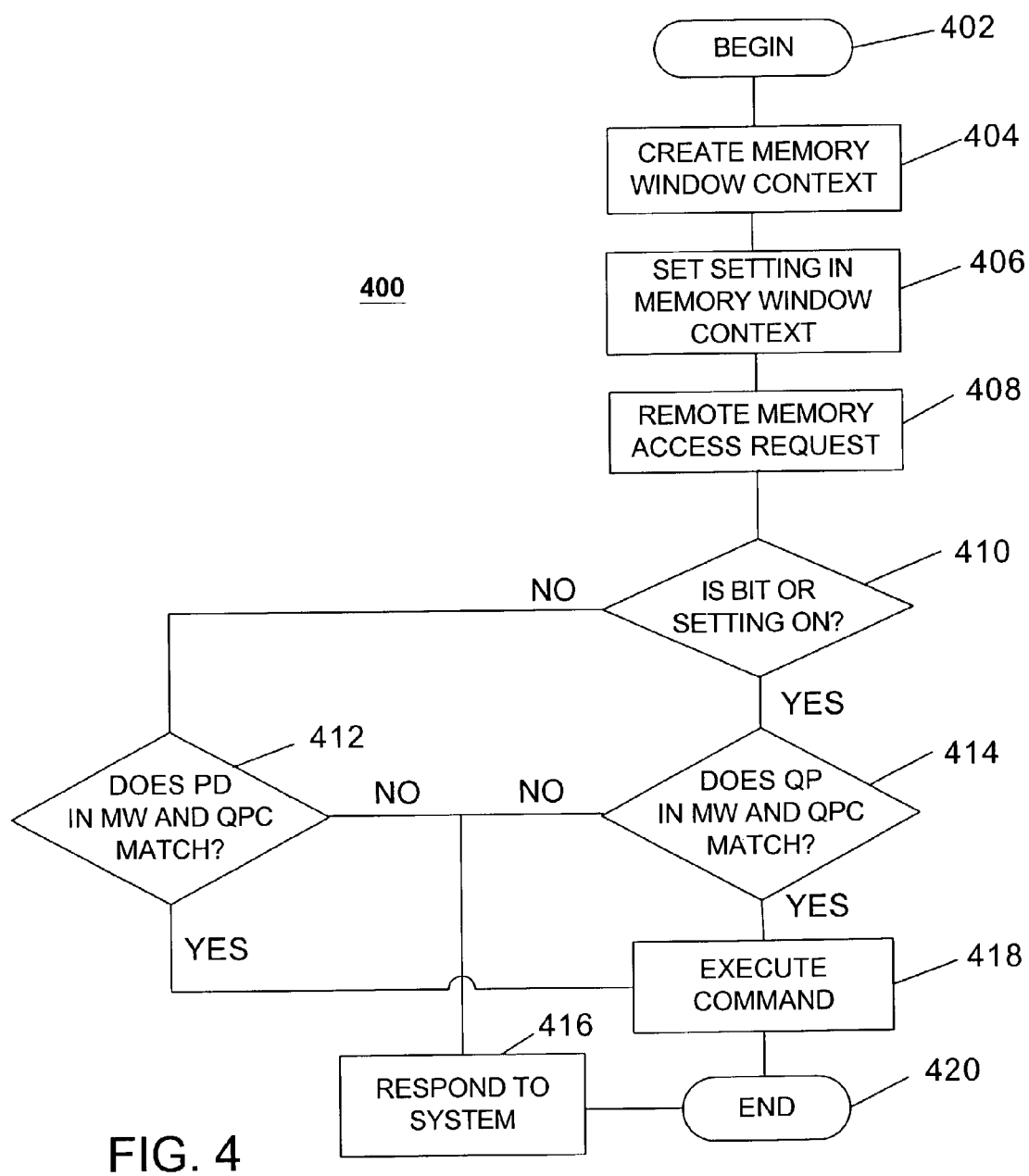
FIG. 4 illustrates a flow chart of computer network in accordance with embodiments of the present invention.

Turning to FIG. 4, a flow diagram is illustrated in accordance with embodiments of the present invention. In the diagram, generally referred to by reference numeral 400, a memory window attribute may be implemented and may be utilized in a system, such as a computer system. The bit or setting may correspond to the attribute 319 (FIG. 3). The process begins at block 402. At block 404, a memory window context may be created. The memory window context may be within a TPT, such as the TPT 314 in FIG. 3, and may be created from a verb or command that is received or another similar type operation.

The bit or setting in the memory window context may be set to indicate if the memory window may be accessed by a specific QP or group of QPs, such as QP 315 or 317 of FIG. 3, in a certain protection domain, as shown at block 406. For instance, the bit or setting may be set as a result of a binding the memory window. The setting may be determined by information within a work request, a verb or command, window context information or the QP context, as discussed above with regard to FIG. 3. Also, the consumer or process that may be the target of the memory operation may enable the buffer for remote access by binding a window to a registered memory region. For instance, in a specific process, the QPs may be limited to access memory windows bound by a certain QP. Accordingly, the memory windows may be bound against a designated QP that binds the memory window.

When a remote memory access begins at block 408, the memory access rights may be validated through various processes. At block 410, the memory window access bit may be determined. At block 412, the PD in the memory window context may be validated against the PD in the QP context. If the PDs in the memory window context and the QP context are a match, then the command may be executed in block 418. The execution of the command may include accessing the memory segment through the memory window, which may have been bound by any of the QPs in the protection domain. However, if PDs in the memory window context and the QP context do not match, then the system may respond to the request at block 416. The response to the request may include terminating the connection or sending an invalid request message.

At block 414, the QP in the memory window context may be validated against the QP in the QP context. If the QPs in the memory window context and the QP context are a match, then the command may be executed in block 418. The execution of the command may include accessing the memory segment through the memory window. However, if QPs in the memory window context and the QP context do not a match, then the system may respond to the request at block 416. The response to the request may include terminating the connection or sending an invalid request message. The process ends at block 420.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A memory window access mechanism, comprising:
a protection domain;
a memory window associated with the protection domain;
a plurality of queue pairs, each of the plurality of queue pairs being associated with the protection domain;
an attribute associated with the memory window that enables access to the memory window only by a single one of the plurality of queue pairs; and
a context associated with the single one of the plurality of queue pairs, wherein the context includes information relating to a protection domain, access rights, send queue information, receive queue information, completion queue information, or information about a local port connected to the queue pair and/or remote port connected to the queue pair, or a combination thereof,
wherein the attribute can be disabled such that access to the memory window can only be granted by validating that the protection domain associated with the memory window matches against the context, and wherein if the matching between the context and the protection domain is not validated the access to the memory window is terminated.

2. The memory window access mechanism set forth in claim 1 wherein the attribute is defined in a translation and protection table ("TPT").

3. The memory window access mechanism set forth in claim 2, wherein the attribute includes an identifying value associated with the single one of the plurality of queue pairs.

4. The memory window access mechanism set forth in claim 1, wherein the attribute comprises a bit that defines whether to allow access to the memory window by the plurality of queue pairs or only by the single one of the plurality of queue pairs.

5. The memory window access mechanism set forth in claim 1, wherein a verb defines the single one of the plurality of queue pairs.

6. The memory window access mechanism set forth in claim 1, wherein access to the memory window is permitted if a requesting device corresponding only to the single one of the plurality of queue pairs issues a request to access the memory window.

7. The memory window access mechanism set forth in claim 1, wherein access to the memory window is permitted if a requesting queue pair corresponding only to the single one of the plurality of queue pairs issues a request to access the memory window.

8. A computer network, comprising:
a plurality of computer systems;
at least one input/output device;
a switch network that connects the plurality of computer systems and the at least one input/output device for communication; and
wherein the plurality of computer systems and the at least one input/output device comprises a memory window access mechanism, the memory window access mechanism comprising:
a protection domain;
a memory window associated with the protection domain;
a plurality of queue pairs, each of the plurality of queue pairs being associated with the protection domain;
an attribute associated with the memory window that enables access to the memory window only by a single one of the plurality of queue pairs; and
a context associated with the single one of the plurality of queue pairs, wherein the context includes information relating to a protection domain, access rights, send queue information, receive queue information, completion queue information, or information about a local port connected to the queue pair and/or remote port connected to the queue pair, or a combination thereof, wherein the attribute can be disabled such that access to the memory window can only be granted by validating that the protection domain associated with the memory window matches against the context, and wherein if the matching between the context and the protection domain is not validated the access to the memory window is terminated.

9. The computer network set forth in claim 8 wherein the attribute is defined in a translation and protection table ("TPT").

10. The computer network set forth in claim 9, wherein the attribute includes an identifying value associated with the single one of the plurality of queue pairs.

11. The computer network set forth in claim 8, wherein the attribute comprises a bit that defines whether to allow access to the memory window from only the single one of the plurality of queue pairs or the plurality of queue pairs.

12. The computer network set forth in claim 8, wherein a verb defines the single one of the plurality of queue pairs.

13. The computer network set forth in claim 8, wherein access to the memory window is permitted if a requesting device corresponding only to the single one of the plurality of queue pairs issues a request to access the memory window.

14. The computer network set forth in claim 8, wherein access to the memory window is permitted if a requesting queue pair corresponding only to the single one of the plurality of queue pairs issues a request to access the memory window.

15. A method for providing access to a memory window, the method comprising the acts of:

creating a protection domain;

defining a plurality of queue pairs, each of the plurality of queue pairs being associated with the protection domain;

binding a memory window associated with the protection domain, the memory window having an attribute that enables access thereto only by a single one of the plurality of queue pairs;

setting the attribute to enable access to the memory window only by the single one of the plurality of queue pairs;

validating that the protection domain associated with the memory window matches against a context associated with the single one of the plurality of queue pairs if the setting of the attribute is not enabled, wherein the context includes information relating to a protection domain, access rights, send queue information, receive queue information, completion queue information, or information about a local port connected to the queue pair and/or remote port connected to the queue pair, or a combination thereof; and terminating access to the memory window if both the setting of the attribute is not enabled and the matching between the protection domain and the context associated with the queue pair cannot be validated.

16. The method set forth in claim 15, comprising defining the attribute in a translation and protection table ("TPT").

17. The method set forth in claim 15, comprising defining a value associated with the single one of the plurality of queue pairs.

18. The method set forth in claim 15, comprising defining a bit that defines whether to allow access to the memory window from only the single one of the plurality of queue pairs or the plurality of queue pairs.

19. The method set forth in claim 15, comprising defining the single one of the plurality of queue pairs with a verb.

20. The method set forth in claim 15, comprising permitting access to the memory window if a requesting device corresponding only to the single one of the plurality of queue pairs issues a request to access the memory window.

21. The method set forth in claim 15, comprising permitting access to the memory window if a requesting queue pair corresponding only to the single one of the plurality of queue pairs issues a request to access the memory window.

* * * * *